United States Patent

Yamakawa et al.

Patent Number: 6,053,452
Date of Patent: Apr. 25, 2000

[54] COMPENSATION APPARATUS FOR MAIN ROTOR TORQUE

[75] Inventors: Eiichi Yamakawa; Natsuki Kondo, both of Kakamigahara, Japan

[73] Assignee: Advanced Technology Institute of Commuter-Helicopter, Ltd., Gifu, Japan

[21] Appl. No.: 08/970,122

[22] Filed: Nov. 13, 1997

[30] Foreign Application Priority Data

Mar. 26, 1997 [JP] Japan .................................. 9-073159

[51] Int. Cl.⁷ ............................................ B64C 27/00
[52] U.S. Cl. ............................................... 244/17.19
[58] Field of Search ........................... 244/17.11, 17.19

[56] References Cited

U.S. PATENT DOCUMENTS

| | | |
|---|---|---|
| 4,708,305 | 11/1987 | Kelley et al. . |
| 4,726,547 | 2/1988 | Zimmer . |
| 4,799,859 | 1/1989 | Zimmer . |
| 4,809,931 | 3/1989 | Mouille et al. . |
| 4,948,068 | 8/1990 | VanHorn . |
| 5,123,613 | 6/1992 | Piasecki . |
| 5,131,604 | 7/1992 | Yoerkie, Jr. et al. . |
| 5,188,511 | 2/1993 | Ebert . |
| 5,232,183 | 8/1993 | Rumberger ........................... 244/17.19 |
| 5,240,205 | 8/1993 | Allongue ............................... 244/17.19 |
| 5,251,847 | 10/1993 | Guimbal . |
| 5,388,785 | 2/1995 | Rollet et al. . |
| 5,498,129 | 3/1996 | Dequin et al. . |
| 5,566,907 | 10/1996 | Marze et al. . |
| 5,588,618 | 12/1996 | Marze et al. . |
| 5,634,611 | 6/1997 | Marze et al. . |
| 5,645,249 | 7/1997 | Hein ...................................... 244/17.11 |
| 5,649,678 | 7/1997 | Nurick ................................... 244/17.19 |

FOREIGN PATENT DOCUMENTS

| | | |
|---|---|---|
| 2388845 | 1/1976 | France . |
| 1144116 | 2/1963 | Germany . |
| 3121996 | of 0000 | Japan . |
| 427697 | of 0000 | Japan . |

*Primary Examiner*—Peter M. Poon
*Assistant Examiner*—Charles R. Ducker, Jr.
*Attorney, Agent, or Firm*—Baker Botts L.L.P.

[57] ABSTRACT

A main rotor torque compensation apparatus for a helicopter having a main rotor and a tail rotor includes vertical tails that are supported at a variable angle of attack. An actuator adjusts the angle of attack such that the main rotor torque is compensated by the torque of the tails together with the torque of the tail rotor.

3 Claims, 6 Drawing Sheets

COMPENSATION APPARATUS FOR MAIN ROTOR TORQUE

BACKGROUND OF THE INVENTION

1. Field of the Invention

The present invention relates to a compensation apparatus for compensating a main rotor torque by generating a torque opposing the main rotor torque of a helicopter.

2. Description of Related Art

In a helicopter having a main rotor and a tail rotor, rotation of the main rotor causes the helicopter fuselage to counter with a torque T1 in a direction opposite to the rotational direction of the main rotor. A thrust of the tail rotor is utilized for offsetting the torque T1, and the tail rotor generates a torque T2 in the direction opposite that of torque T1. Further, a vertical tail which is attached to the fuselage with a constant angle of attack generates a torque T3 in the direction identical to that of torque T2. These torques cancel out each other according to the equation T1+T2+T3=0, so as to maintain the attitude of the fuselage.

In recent years, there has been an increasing demand for helicopters which can take off and land on a heliport in urban areas, and the resulting increase in noise must be reduced.

One of the effective countermeasures against the noise is to decrease the rotational speed of the main rotor. However, when the rotational speed of the main rotor changes, the main rotor torque of the helicopter changes and torque T1 no longer balances out torques T2 and T3. In this case, the pilot steers a rudder pedal to change the pitch angle of the tail rotor and adjusts torque T2 to maintain the attitude of the fuselage.

However, when torque T2 is adjusted by steering the rudder pedal, the pilot has to continuously control the rudder pedal, which imposes a great burden on the pilot. In existing helicopters, the pilot steers the rudder pedal to compensate for the change of the main rotor torque T1 by adjusting torque T2 in the direction opposite to that caused by the tail rotor.

SUMMARY OF THE INVENTION

An object of the present invention is to provide a compensation apparatus for a main rotor torque capable of maintaining the attitude of a fuselage and reducing pilot workload.

The present invention provides a compensation apparatus for a main rotor torque in a helicopter having a main rotor and a tail rotor, comprising:

a vertical tail which is attached to the fuselage at a variable angle of attack; and angle of attack adjusting means for adjusting the angle of attack of the vertical tail for compensating, together with the tail rotor, the negative of the main rotor torque.

In accordance with the present invention, since the angle of attack of the vertical tail is variable, the torque generated by the vertical tail can be adjusted. Usually, the torque generated by the tail rotor, in addition to that of the vertical tail, cancels out the negative of the main rotor torque. When the torque of the main rotor changes, the change in the negative main rotor torque can be compensated by the tail rotor as well as by the change of the angle of attack of the vertical tail. More specifically, at high airspeed the vertical tail generates a large torque even with a small angle of attack, allowing for effective torque compensation at such airspeed. Conversely, at low airspeed, the vertical tail, in cooperation with the tail rotor which effectively compensates at such airspeed, can effectively compensate for the main rotor torque.

Further, it is preferable in the invention that the compensation apparatus further comprises:

airspeed measuring means for measuring airspeed;

main rotor torque measuring means for measuring the main rotor torque;

pitch angle adjusting means for adjusting the pitch angle of the tail rotor; and control means for controlling the angle of attack adjusting means of the vertical tail and the pitch angle adjusting means of the tail rotor based on the measured airspeed and main rotor torque.

In accordance with the invention, since the pitch angle of the tail rotor and the angle of attack of the vertical tail are controlled based on the measured airspeed and main rotor torque, when the torque balance is lost by a change in airspeed or a change in main rotor torque, the balanced state can be restored automatically. Thus, it is unnecessary for the pilot to adjust the rudder pedal even when the airspeed or the main rotor torque changes, and the pilot's workload can be greatly reduced. Further, since both the pitch angle of the tail rotor and the angle of attack of the vertical tail are variable, the entire torque can be adjusted more reliably at various airspeeds and the fuselage attitude can be maintained more stably.

Further, as airspeed increases it is preferable in the invention that the amount of torque compensation by the vertical tail is increased and the amount of torque compensation by the tail rotor is decreased.

In accordance with the present invention, the tail rotor is effective for torque compensation at low airspeed and the vertical tail is effective for torque compensation at high airspeed. On the other hand, when airspeed is relatively low, the main rotor torque decreases as airspeed increases, whereas when airspeed is relatively high, the main rotor torque increases as airspeed increases. Thus, the compensation combination of vertical tail torque, which increases relative to airspeed, and tail rotor torque, which decreases relative to airspeed, shows the same airspeed dependence as main rotor torque, resulting in more reliable overall torque compensation. This combination also results in more effective torque compensation over a wider range of airspeed.

Further, it is preferable in the invention that the compensation apparatus further comprises rotational speed measuring means for measuring the rotational speed of the main rotor, wherein the control means adjusts the amount of torque compensation based on the measured rotational speed.

In accordance with the invention, since the amount of torque compensation can be adjusted based on both the main rotor torque and the measured rotational speed when the rotational speed of the main rotor changes, the accuracy of compensation is greatly improved and the change in main rotor torque caused by the change in rotational speed can be compensated more reliably.

Further, it is preferable in the invention that if the tail rotor fails while the helicopter is flying at a constant airspeed, the vertical tail torque compensation is increased to compensate for the loss of tail rotor torque compensation.

In accordance with the invention, the helicopter can continue to fly with some airspeed when the tail rotor fails, since the vertical tail can perform the torque compensation normally performed by the tail rotor.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Figure 1:
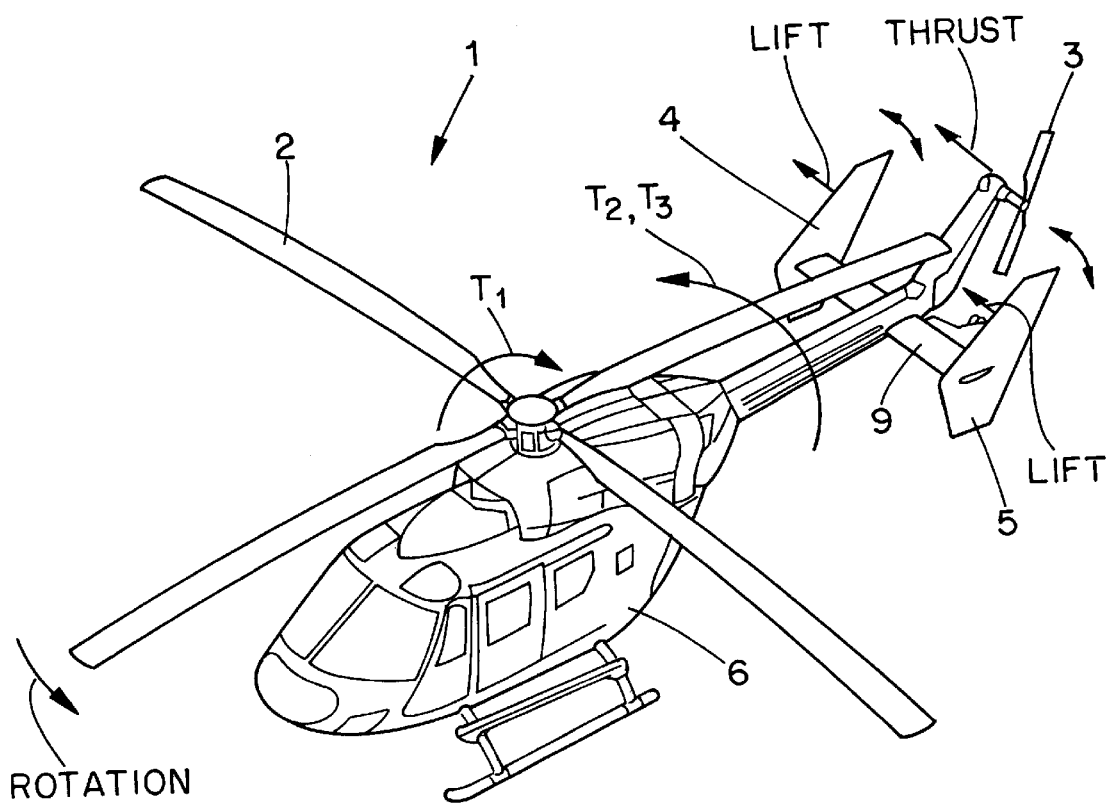
FIG. 1 is a perspective view illustrating an embodiment of the present invention.

Now referring to the drawings, preferred embodiments of the invention are described below.

FIG. 1 is a view illustrating an embodiment of the invention. When a main rotor 2 rotates, a fuselage 6 of a helicopter 1 counters with a torque T1 in the direction opposite to the rotational direction of the main rotor 2. On the other hand, a tail rotor 3 generates a thrust by rotating at a variable pitch angle, to generate a torque T2 in the direction opposite to that of torque T1. Further, vertical tails 4 and 5 are supported at a variable angle of attack and produce lift forces when the helicopter 1 flies forward, to generate a torque T3 in the same direction as torque T2. Torques T1 to T3 offset each other according to the equation T1+T2+T3=0, thereby maintaining the attitude of the fuselage 6.

Figure 2:
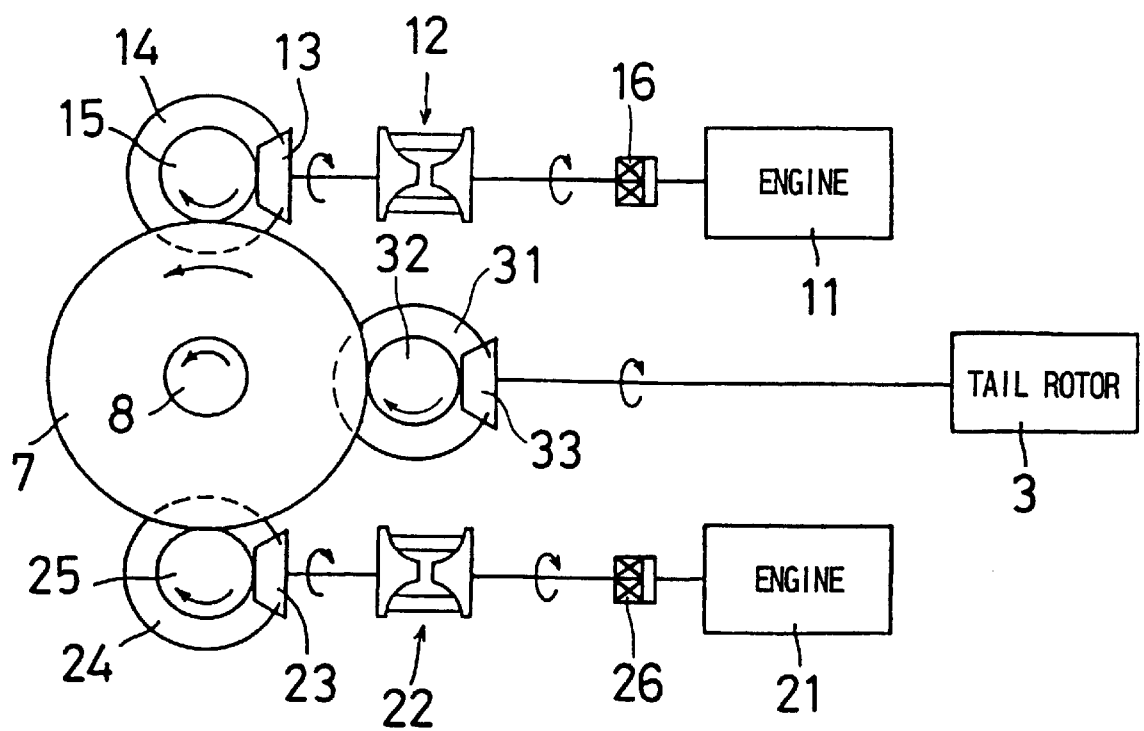
FIG. 2 is a view illustrating a power transmission system of a helicopter shown in FIG. 1.

FIG. 2 is an explanatory view of a driving system for the helicopter 1 of FIG. 1. A pair of power shafts of engines 11 and 21 are connected to traction speed changing mechanisms 12 and 22 by way of free wheel clutches 16 and 26. Free wheel clutches 16 and 26 are capable of torque transmission in one direction. Traction speed changing mechanisms 12 and 22 can be half-toroidal type CVT (continuously variable transmission) or full-toroidal type CVT, respectively, to decelerate or accelerate at a desired rotational speed changing ratio. The power shafts of the traction speed changing mechanisms 12 and 22 are connected to bevel gears 13 and 23, respectively, and further engage bevel gears 14 and 24 to change the direction of the rotational axis. A gear 15, which rotates integrally with bevel gear 14, and a gear 25, which rotates integrally with bevel gear 24, engage a collector gear 7 to rotationally drive a main rotor shaft 8. Collector gear 7 further engages a gear 32 which rotates integrally with a bevel gear 31 to rotationally drive the tail rotor 3 via bevel gear 33.

By adjusting the rotational speed changing ratio of traction speed changing mechanisms 12 and 22 while keeping the rotational speed of the engines 11 and 21 constant, the rotational speed of the main rotor 2, which is connected to the main rotor shaft 8, can be adjusted.

Figure 3:
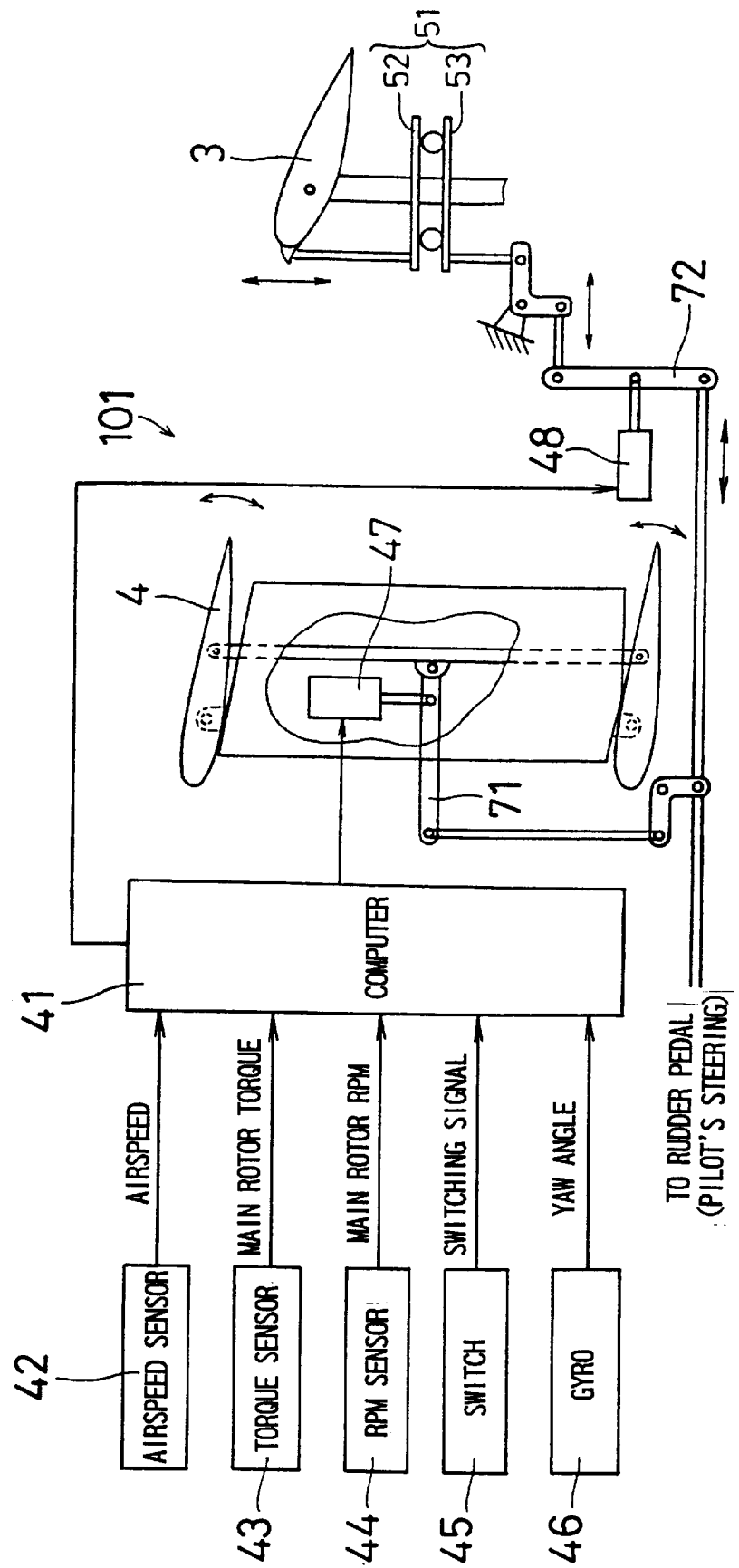
FIG. 3 is a view illustrating a torque compensation apparatus of the helicopter shown in FIG. 1.

FIG. 3 is a view illustrating a torque compensation apparatus 101 of the helicopter 1. Vertical tails 4 and 5 are linked to each other, and each has a variable angle of attack. As to the tail rotor, a non-rotating swash plate 53 moving along a tail rotor shaft displaces a rotating swash plate 52 rotating on the tail rotor shaft to make the pitch angle of the tail rotor 3 variable.

Airspeed measured by an airspeed sensor 42, torque T1 of the main rotor 2 measured by a torque sensor 43, the rotational speed of the main rotor 2 measured by a rotational speed sensor 44, a switching signal from a switch 45, and a yaw angle measured by a gyro 46 are sent to a computer 41, which drives actuators 47 and 48 based on these signals. Inputs from actuators 47 and 48 and the pilot's steering inputs from the rudder pedal are mixed by levers 71 and 72. Accordingly, the angle of attack of the vertical tails 4 and 5 and the pitch angle of the tail rotor 3 can be controlled by the pilot's steering of the rudder pedal irrespective of the control position of the actuators 47 and 48. When the pilot does not operate the rudder pedal, the actuators 47 and 48 are controlled by input from the computer 41, whereby the angle of attack of the vertical tails 4 and 5 and the pitch angle of the tail rotor 3 can be adjusted to automatically compensate for the torque of the main rotor 2.

Alternatively, the torque compensation apparatus may be of a constitution as shown below in FIG. 4 and FIG. 5.

Figure 4:
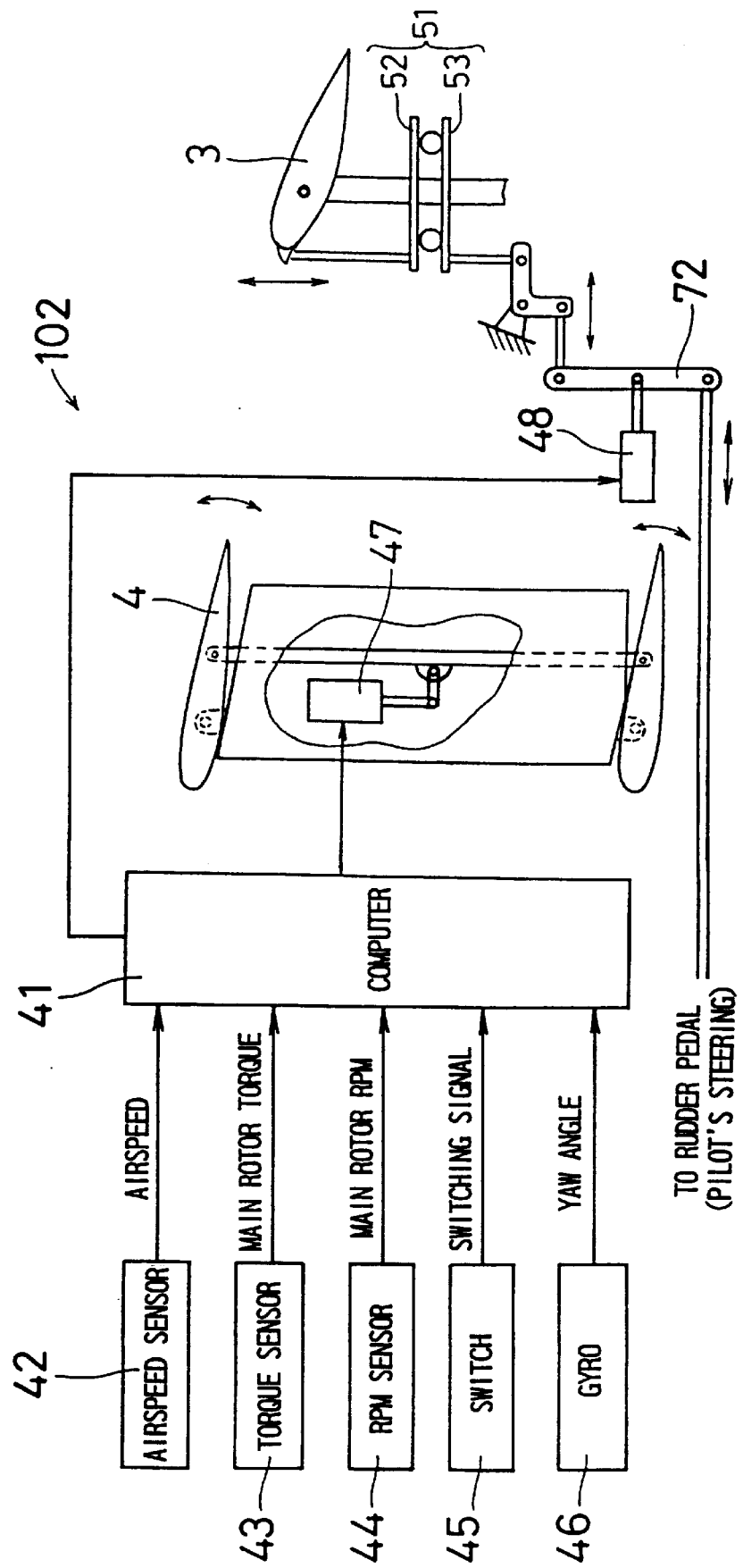
FIG. 4 is a view illustrating a second torque compensation apparatus.

FIG. 4 is a view illustrating a torque compensation apparatus 102 of the helicopter 1. In torque compensation apparatus 102, which differs from torque compensation apparatus 101, a rudder pedal is interlocked with actuator 48 but not interlocked with actuator 47. Accordingly, the angle of attack of vertical tails 4 and 5 is controlled only by the computer 41, and the pitch angle of the tail rotor 3 is adjusted by both the computer 41 and the rudder pedal. In this way, the angle of attack of vertical tails 4 and 5 and the pitch angle of tail rotor 3 can be controlled individually, and the pilot's steering input and the control by computer 41 can be provided to adjust the pitch angle of the tail rotor 3.

Figure 5:
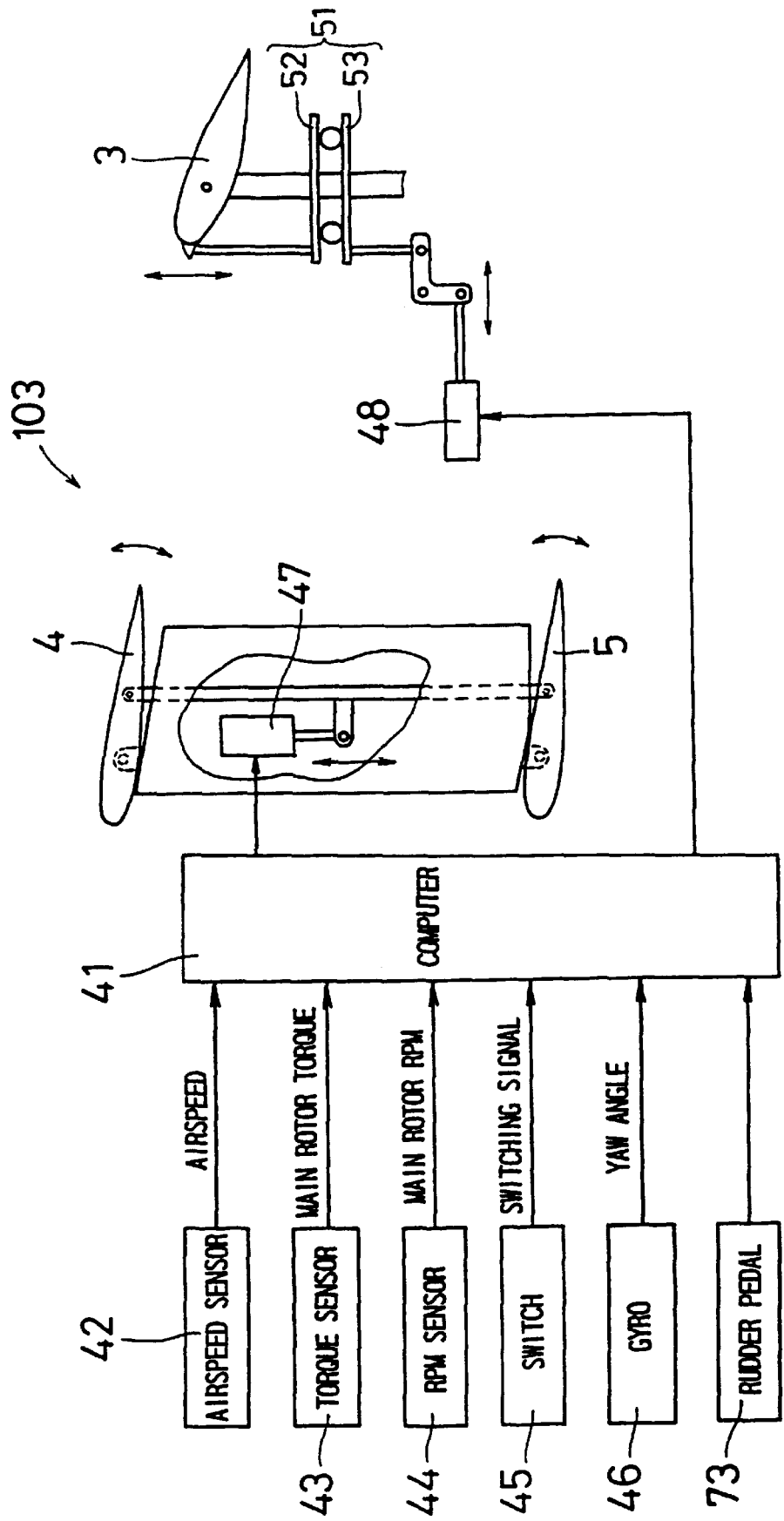
FIG. 5 is a view illustrating a third torque compensation apparatus.

FIG. 5 is a view illustrating a torque compensation apparatus 103 of the helicopter 1. In torque compensation apparatus 103, which differs from torque compensation apparatuses 101 and 102, the rudder pedal 73 is electrically connected to computer 41. The steering input from the rudder pedal 73 is sent to the computer 41. Actuator 47 controls the angle of attack of vertical tails 4 and 5 based on the signal from the computer 41. Actuator 48 controls the pitch angle of the tail rotor 3 based on the signal from the computer 41. Accordingly, the angle of attack of the vertical tails 4 and 5 and the pitch angle of the tail rotor 3 can be adjusted individually, and the pilot's steering input can also be provided via the computer 41 to adjust each angle.

Additionally, torque compensation apparatus 101 shown in FIG. 3 allows a helicopter to continue flying controlled by the pilot steering the rudder pedal even when the computer 41, the airspeed sensor 42, the torque sensor 43, the rotational speed sensor 44, the switch 45 or the gyro 46 in the electrical system have failed. Further, apparatus 101 may be constructed so as to use no part of the electrical system, and the pilot can adjust both the angle of attack of the vertical tails 4 and 5 and the pitch angle of the tail rotor 3.

Figure 6:
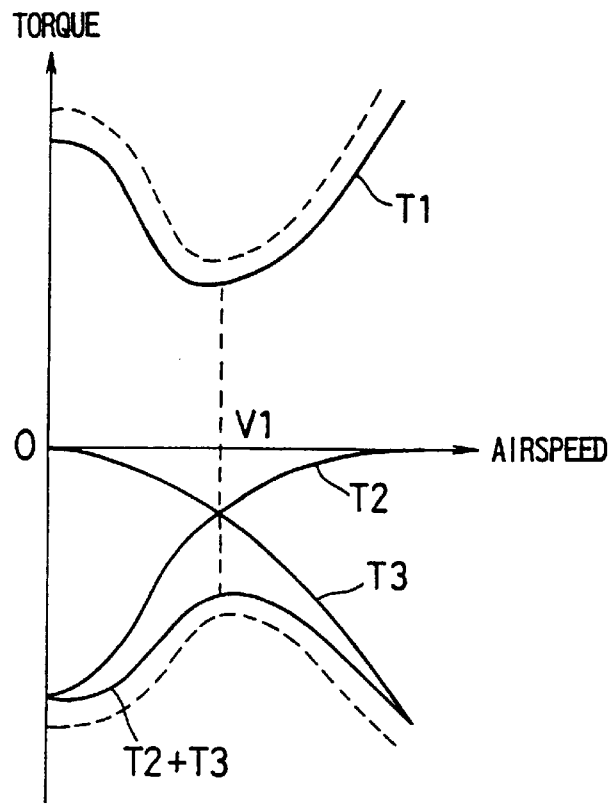
FIG. 6 is a graph illustrating airspeed dependence of torques T1 to T3.

FIG. 6 is a graph illustrating airspeed dependence of torques T1 to T3. In the graph, the abscissa represents the airspeed of the helicopter 1, while the ordinate represents torques T1 to T3 and (T2+T3). As airspeed increases from zero, the amount of airflow through the main rotor increases, and the main rotor torque decreases. However, torque T1 starts to increase at a certain velocity V1, for example, 60 kt. To cancel out torque T1, it is necessary for the sum of torques T2 and T3 to be identical to torque T1 in magnitude and opposite to the direction of torque T1, i.e., T2+T3=−T1.

In order to keep the tail rotor load within some limit, the tail rotor thrust must be reduced as airspeed increases. Therefore the absolute value of torque T2 decreases as airspeed increases. On the other hand, as airspeed increases, the dynamic pressure of the air on the vertical tails 4 and 5 increases and the absolute value of torque T3 increases.

Accordingly, the effectiveness of the tail rotor 3 dominates at low airspeed, whereas the effectiveness of the vertical tails 4 and 5 dominates at high airspeed. That is, when both monotonically decreasing absolute value of torque T2 and monotonically increasing absolute value of torque T3 are combined, the sum of torques T2 and T3 can easily correspond to the increase and decrease of torque T1, allowing for more reliable torque compensation.

Further, when the rotational speed of the main rotor 2 is changed by the traction speed changing mechanisms 12 and 22 in FIG. 2, torque T1 of the main rotor 2 in FIG. 6 changes over the entire speed range. In this case, as shown in FIG. 3 to FIG. 5, the pitch angle of the tail rotor 3 and the angle of attack of the vertical tails 4 and 5 are adjusted automatically, whereby the sum of torques T2 and T3 is changed and balances again with torque T1.

Upon failure of the tail rotor 3 during forward flight of a helicopter 1, when the pilot confirms the failure and then turns the switch 45 to ON, a switching signal is sent to the computer 41. Computer 41 controls the actuator 47 based on the switching signal so as to compensate the amount of torque T2 (made by the tail rotor 3) by increasing the compensation amount of torque T3 (made by the vertical tails 4 and 5). Alternatively, a yaw angle (without the pilot's steering inputs) of the fuselage 6 measured by the gyro 46 is sent to the computer 41. Computer 41 compares the yaw angle with a predetermined threshold value and, if the yaw angle is greater than the threshold value, controls the actuator 47 so as to compensate the amount of torque T2 (made by the tail rotor 3) by increasing the compensation amount of torque T3 (made by the vertical tails 4 and 5). This allows the helicopter to return to a landing base even upon failure of the tail rotor 3 by adjusting the angle of attack of the vertical tails 4 and 5.

Figure 7:
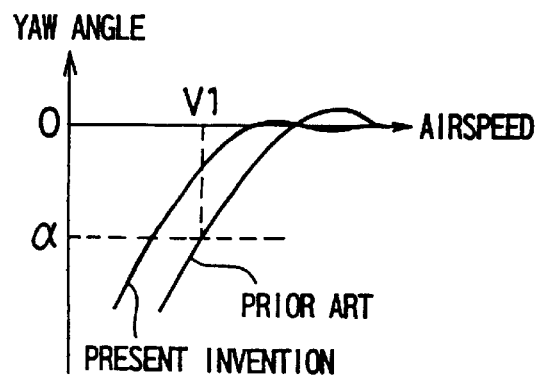
FIG. 7 is a graph illustrating airspeed dependence of yaw angles of the helicopter.

FIG. 7 is a graph illustrating airspeed dependence of helicopter yaw angles. The abscissa represents airspeed, while the ordinate represents the yaw angle. The graph shows the yaw angle of the helicopter 1 according to the present invention and the yaw angle of the existing helicopter upon failure of the tail rotor. Helicopter 1 can fly while keeping the yaw angle at a at a lower airspeed than the existing helicopter. While the yaw angle is at a predetermined value a, for example, −15 degrees, at a speed V1 such as 60 kt in the existing helicopter, the yaw angle of helicopter 1 according to the present invention is smaller than that of the existing helicopter. Thus, the range of speed in which the helicopter can return to the landing base includes lower speeds, thereby enabling a safer return flight.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An apparatus for compensating for the main rotor torque in a helicopter having a main rotor and a tail rotor, comprising:

means for directly sensing the main rotor torque;

means for adjusting the pitch angle of the tail rotor;

means for measuring airspeed;

means for measuring the rotational speed of the main rotor;

a vertical tail supported at a variable angle of attack;

means for adjusting the angle of attack of the vertical tail; and means for controlling the angle of attack adjusting means and the pitch angle adjusting means based on the measured airspeed, the measured rotational speed of the main rotor, and the directly sensed main rotor torque so as to adjust the main rotor torque compensation.

2. The apparatus according to claim 1, wherein the controlling means is arranged such that as airspeed increases, the amount of torque compensation by the vertical tail is increased and the amount of torque compensation by the tail rotor is decreased.

3. An apparatus for compensating for the main rotor torque in a helicopter equipped with an engine, a speed-changing mechanism whose speed changing ratio is variable, a collector gear, a main rotor and a tail rotor moving together with the collector gear at a constant speed ratio, in which the main rotor and the tail rotor are rotationally driven by transmitting power of the engine to the collector gear via the speed-changing mechanism, the apparatus comprising:

means for directly sensing the main rotor torque;

means for adjusting the pitch angle of the tail rotor;

means for measuring airspeed;

means for measuring the rotational speed of the main rotor;

a vertical tail supported at a variable angle of attack;

means for adjusting the angle of attack of the vertical tail; and means for controlling the angle of attack adjusting means and the pitch angle adjusting means based on the measured airspeed, the measured rotational speed of the main rotor, and the directly sensed main rotor torque so as to adjust the main rotor torque compensation.

* * * * *